No. 652,403. Patented June 26, 1900.
J. B. SCHÄFER.
ICE CREAM FREEZER.
(Application filed Oct. 9, 1899.)
(No Model.)
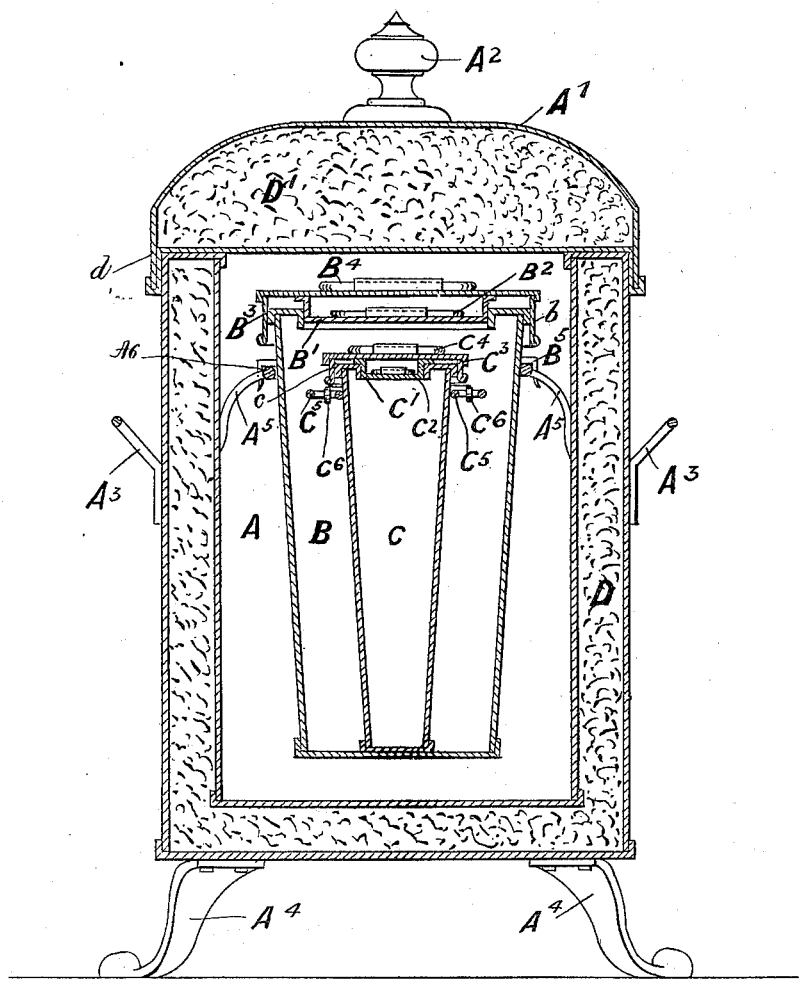

UNITED STATES PATENT OFFICE.

JEHU BAXTER SCHÄFER, OF LONDON, ENGLAND.

ICE-CREAM FREEZER.

SPECIFICATION forming part of Letters Patent No. 652,403, dated June 26, 1900.

Application filed October 9, 1899. Serial No. 733,062. (No model.)

*To all whom it may concern:*

Be it known that I, JEHU BAXTER SCHÄFER, a subject of the Queen of Great Britain, residing at London, England, have invented certain new and useful Improvements in Ice-Cream Freezers, of which the following is a full and complete specification, such as will enable those skilled in the art to which it appertains to make and use the same.

This invention relates to ice-cream freezers; and it has for its object to provide a simple and improved device for use in freezing ice-cream and for analogous purposes which will operate effectively and quickly and automatically and without necessity for the usual process of turning.

The invention is fully disclosed in the following specification, of which the accompanying drawing forms a part, in which the separate parts of my improvement are designated by letters of reference, said drawing being a vertical sectional view.

In the drawing forming part of this specification, A designates the main vessel or body of the device, which is mounted upon suitable legs or standards $A^4$ and is provided with double side walls and a double bottom, as shown, within which is filled any suitable substance, as at D, which will thoroughly insulate the main interior chamber of the vessel A against the outside atmosphere. The chamber of the vessel A opens at its top end, and this opening is closed by a suitable lid A', carrying a convenient handle $A^2$ and provided with double walls, within which is filled insulating material, as at D. The cover A' preferably embodies a downwardly-projecting annular peripheral bottom flange $d$, which tightly embraces the exterior walls of the vessel A to form a tight joint. The main vessel A is provided exteriorly with suitable side handles $A^3$, by which it may be conveniently lifted and transported.

At a suitable height within the chamber of the main vessel A are provided projecting brackets or supports $A^5$, which carry an annular member or ring of wire $A^6$, and downwardly within this ring is inserted and mounted a removable vessel or container B, which is exteriorly provided with catches or projections $B^5$, which engage over the ring $A^6$ and serve to support the vessel B and also to properly retain it in place, so that it will not float within the chamber of the main vessel A when the ice melts into water.

Within the vessel or container B is placed an inner cylinder or vessel C, which is designed to hold ice and salt, and which is placed, as shown, centrally within the vessel B, so that it will be surrounded by the cream or custard or other substance which is being frozen within said container B. This inner cylinder or vessel C is provided with an inner lid C', having a suitable handle, as at $C^2$, by which it may be removed from the top orifice or mouth-opening of the vessel C. The lid C is in turn covered by a similar outer lid $C^3$, which projects entirely over the whole top of the vessel C and is provided with a suitable downwardly - extending annular flange $c$ for the purpose of forming a tight joint against the sides of the vessel C, and it is also provided with a suitable handle $c^4$, by which it may be conveniently manipulated. The vessel or container B is likewise provided with an inner lid B', closing the top orifice or mouth-opening and provided with a suitable handle $b^2$, while said lid B' is in turn covered by an outer lid $B^3$, provided with a suitable handle $B^4$.

In the construction of the double-lid mechanism for the vessels B and C the same general construction is preferably employed for both of said vessels, and in carrying out the same the inner lid is preferably arranged so that it projects downwardly within the top orifice or mouth-opening, (the latter being of less diameter than the full diameter of the vessel,) while the outer lid rests upon the projecting top edge of the inner lid and is of a diameter extending entirely across or over the top of the vessel and has a downwardly-extending peripheral flange (as at $c$ and $b$, respectively) which forms a tight closure against the exterior wall of the vessel.

The inner cylinder or vessel C is provided with a suitable handle $C^6$ to enable the withdrawal of the cylinder from the mass of frozen ice-cream and from the container B. This handle turns downwardly to permit of the adjustment of the covers of the container B. Said handle is connected with two ears $C^5$, projecting laterally from the cylinder C and serving to prevent said cylinder or vessel from falling to one side or the other.

The operation and advantages of my invention will be readily understood. In use it is simply necessary to fill the cylinder or vessel C with the ice and salt and place it in the container B. The custard or cream or other material to be frozen is then poured into the container B up to about the level of the ring $C^5$. The lids or covers are then tightly adjusted upon both the vessels C and B, and ice and salt are filled within the chamber of the main vessel A, so that they entirely surround the container B and also cover the top of the same. The main lid A' is then placed in position, and the apparatus is permitted to stand for a period of, say, about twenty minutes. The lid A' can then be removed, and the top ice and salt are brushed down to about the level of the ring $B^5$, when the lids of the container B are removed, thus permitting the withdrawal of the cylinder C, when the material within the container B is simply stirred and will then be in a uniformly-frozen condition. If it is necessary to again freeze the ice-cream in the container B after it has somewhat melted, it is simply necessary to replace the cylinder C in position again after filling it with fresh ice and salt.

My invention possesses many advantages over the usual forms and constructions of ice-cream freezers, especially those in which a turning or revoluble movement is necessary for the operation of freezing. The operation of the apparatus can be made virtually continuous by adding fresh custard or cream or other desired material from time to time, when the freezing process will be continued uninterruptedly, and the only stop necessary in the operation of the machine need be for purposes of cleaning. The construction of the device also enables the safe placing of the ice and salt so that they entirely surround the container, any liability of their getting into the latter being prevented by the improved double-lid construction, as hereinbefore mentioned.

Having fully described my invention, I claim as new and desire to secure by Letters Patent—

A device of the class described, comprising a main vessel or compartment provided with a removable lid or cover, means for suspending or supporting a container within said compartment consisting of brackets secured to said compartment and with which a ring is connected, a container mounted or supported within the compartment and provided with means for engaging said ring, and a removable cylinder or vessel arranged within the container, said cylinder and container being respectively provided with lids or closures, substantially as and for the purpose set forth.

In testimony that I claim the foregoing as my invention I have signed my name, in presence of the subscribing witnesses, this 26th day of September, 1899.

JEHU BAXTER SCHÄFER.

Witnesses:
WALTER J. SKERTEN,
G. F. WARREN.